US 7,883,415 B2

(12) United States Patent
Larsen et al.

(10) Patent No.: US 7,883,415 B2
(45) Date of Patent: Feb. 8, 2011

(54) METHOD AND APPARATUS FOR ADJUSTING A VIEW OF A SCENE BEING DISPLAYED ACCORDING TO TRACKED HEAD MOTION

(75) Inventors: Eric J. Larsen, Foster City, CA (US); Hrishikesh R Deshpande, Mountain View, CA (US); Richard L. Marks, Pleasanton, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 803 days.

(21) Appl. No.: 10/663,236

(22) Filed: Sep. 15, 2003

(65) Prior Publication Data

US 2005/0059488 A1 Mar. 17, 2005

(51) Int. Cl.
*A63F 13/00* (2006.01)
*A63F 9/24* (2006.01)

(52) U.S. Cl. .................................. 463/36; 345/7; 345/8
(58) Field of Classification Search ............... 463/1–69; 345/156, 7, 8
See application file for complete search history.

(56) References Cited

U.S. PATENT DOCUMENTS

| 3,943,277 A | 3/1976 | Everly et al. ................. 348/169 |
| 4,263,504 A | 4/1981 | Thomas ....................... 235/454 |
| 4,313,227 A | 1/1982 | Eder .......................... 398/106 |
| 4,558,864 A | 12/1985 | Medwedeff ............. 273/148 B |
| 4,565,999 A | 1/1986 | King et al. .................... 345/158 |
| 4,802,227 A | 1/1989 | Elko et al. .................... 381/92 |
| 4,823,001 A | 4/1989 | Kobayashi et al. .......... 356/616 |
| 4,843,568 A | 6/1989 | Krueger et al. .............. 382/100 |
| 5,034,986 A | 7/1991 | Karmann et al. ............. 382/103 |
| 5,055,840 A | 10/1991 | Bartlett ........................ 341/31 |
| 5,111,401 A | 5/1992 | Everett et al. ................. 701/24 |
| 5,144,594 A | 9/1992 | Gilchrist ....................... 367/129 |
| 5,260,556 A | 11/1993 | Lake et al. ................... 235/494 |
| 5,297,061 A | 3/1994 | Dementhon et al. ......... 345/180 |
| 5,335,011 A | 8/1994 | Addeo et al. .................. 348/15 |
| 5,426,450 A | 6/1995 | Drumm ....................... 345/168 |
| 5,455,685 A | 10/1995 | Mori .......................... 348/363 |
| 5,534,917 A | 7/1996 | MacDougall ............... 348/169 |
| 5,543,818 A | 8/1996 | Scott .......................... 345/168 |
| 5,557,684 A | 9/1996 | Wang et al. .................. 382/107 |
| 5,563,988 A | 10/1996 | Maes et al. .................. 345/421 |

(Continued)

FOREIGN PATENT DOCUMENTS

EP 0353200 1/1990

(Continued)

OTHER PUBLICATIONS

Jaron Lanier, "Virtually There," Scientific American: New Horizons for Information Technology, 2003.
"The Tracking Cube: A Three-Dimensional Input Device," IBM Technical Disclosure Bulletin, Aug. 1, 1989, pp. 91-95, vol. 32, No. 3B, IBM Corp. New York, US.

(Continued)

*Primary Examiner*—David L Lewis
*Assistant Examiner*—Marcus D Jones
(74) *Attorney, Agent, or Firm*—Martine Penilla & Gencarella, LLP (57) ABSTRACT

A method for processing interactive user control with a scene of a video clip is provided. The method initiates with identifying a head of a user that is to interact with the scene of the video clip. Then, the identified head of the user is tracked during display of the video clip, where the tracking enables detection of a change in position of the head of the user. Next, a view-frustum is adjusted in accordance with the change in position of the head of the user. A computer readable media, a computing device and a system for enabling interactive user control for defining a visible volume being displayed are also included.

22 Claims, 10 Drawing Sheets

U.S. PATENT DOCUMENTS

| | | | |
|---|---|---|---|
| 5,568,928 A | 10/1996 | Munson et al. | 463/37 |
| 5,581,276 A | 12/1996 | Cipolla et al. | 345/156 |
| 5,583,478 A | 12/1996 | Renzi | 340/407.1 |
| 5,586,231 A | 12/1996 | Florent et al. | 345/472 |
| 5,616,078 A | 4/1997 | Oh | 463/8 |
| 5,638,228 A | 6/1997 | Thomas, III | 360/60 |
| 5,649,021 A | 7/1997 | Matey et al. | |
| 5,675,828 A | 10/1997 | Stoel et al. | 395/825 |
| 5,677,710 A | 10/1997 | Thompson-Rohrlich | 345/173 |
| 5,706,364 A | 1/1998 | Kopec et al. | 382/159 |
| 5,768,415 A | 6/1998 | Jagadish et al. | |
| 5,796,354 A | 8/1998 | Cartabiano et al. | 341/22 |
| 5,818,424 A | 10/1998 | Korth | 345/158 |
| 5,850,222 A | 12/1998 | Cone | 345/418 |
| 5,850,473 A | 12/1998 | Andersson | 382/165 |
| 5,870,100 A | 2/1999 | DeFreitas | 345/441 |
| 5,883,616 A | 3/1999 | Koizumi et al. | 345/156 |
| 5,889,672 A | 3/1999 | Schuler et al. | 700/83 |
| 5,900,863 A | 5/1999 | Numazaki | 345/158 |
| 5,913,727 A | 6/1999 | Ahdoot | 463/39 |
| 5,914,723 A | 6/1999 | Gajewska | 345/597 |
| 5,917,493 A | 6/1999 | Tan et al. | 715/835 |
| 5,917,936 A | 6/1999 | Katto | |
| 5,923,306 A | 7/1999 | Smith et al. | 345/2 |
| 5,923,318 A | 7/1999 | Zhai et al. | 345/157 |
| 5,929,444 A | 7/1999 | Leichner | 250/341.7 |
| 5,930,383 A | 7/1999 | Netaer | 382/154 |
| 5,930,741 A | 7/1999 | Kramer | 702/153 |
| 5,937,081 A | 8/1999 | O'Brill et al. | 382/111 |
| 5,959,596 A | 9/1999 | McCarten et al. | 345/2 |
| 5,963,250 A | 10/1999 | Parker et al. | 348/211.6 |
| 5,993,314 A | 11/1999 | Dannenberg et al. | 461/1 |
| 6,009,210 A * | 12/1999 | Kang | 382/276 |
| 6,014,167 A | 1/2000 | Suito et al. | |
| 6,021,219 A | 2/2000 | Andersson et al. | 382/190 |
| 6,031,545 A | 2/2000 | Ellenby et al. | 345/435 |
| 6,031,934 A | 2/2000 | Ahmad et al. | 382/154 |
| 6,037,942 A | 3/2000 | Millington | 715/835 |
| 6,044,181 A | 3/2000 | Szeliski et al. | 382/284 |
| 6,049,619 A | 4/2000 | Anandan et al. | 382/107 |
| 6,056,640 A | 5/2000 | Schaaij | 463/4 |
| 6,057,909 A | 5/2000 | Yahav et al. | 356/5.04 |
| 6,061,055 A | 5/2000 | Marks | |
| 6,075,895 A | 6/2000 | Qiao et al. | |
| 6,091,905 A | 7/2000 | Yahav et al. | 396/106 |
| 6,094,625 A | 7/2000 | Ralston | 702/150 |
| 6,097,369 A | 8/2000 | Wambach | 345/158 |
| 6,100,517 A | 8/2000 | Yahav et al. | 250/208.1 |
| 6,100,895 A | 8/2000 | Miura et al. | |
| 6,101,289 A | 8/2000 | Kellner | 382/276 |
| 6,115,052 A | 9/2000 | Freeman et al. | 345/473 |
| 6,134,346 A | 10/2000 | Berman et al. | 382/163 |
| 6,151,009 A * | 11/2000 | Kanade et al. | 345/641 |
| 6,160,540 A | 12/2000 | Fishkin et al. | 345/184 |
| 6,166,744 A | 12/2000 | Jaszlics et al. | 345/435 |
| 6,173,059 B1 | 1/2001 | Huang et al. | 381/92 |
| 6,175,343 B1 | 1/2001 | Mitchell et al. | 345/8 |
| 6,184,863 B1 | 2/2001 | Sibert et al. | 345/156 |
| 6,195,104 B1 | 2/2001 | Lyons | 345/473 |
| 6,215,898 B1 | 4/2001 | Woodfill et al. | 382/154 |
| 6,243,491 B1 | 6/2001 | Andersson | |
| 6,275,213 B1 | 8/2001 | Tremblay et al. | 345/156 |
| 6,281,930 B1 | 8/2001 | Parker et al. | 348/211.9 |
| 6,282,362 B1 | 8/2001 | Murphy et al. | 386/46 |
| 6,297,838 B1 | 10/2001 | Chang et al. | 715/863 |
| 6,304,267 B1 | 10/2001 | Sata | |
| 6,307,549 B1 | 10/2001 | King et al. | 715/810 |
| 6,307,568 B1 | 10/2001 | Rom | 345/629 |
| 6,323,839 B1 | 11/2001 | Fukuda et al. | 345/157 |
| 6,323,942 B1 | 11/2001 | Bamji | 356/5.01 |
| 6,326,901 B1 | 12/2001 | Gonzales | 340/7.2 |
| 6,327,073 B1 | 12/2001 | Yahav et al. | 359/321 |
| 6,331,911 B1 | 12/2001 | Manassen et al. | 359/260 |
| 6,346,929 B1 | 2/2002 | Fukushima et al. | |
| 6,351,661 B1 | 2/2002 | Cosman | 600/426 |
| 6,371,849 B1 | 4/2002 | Togami | |
| 6,392,644 B1 | 5/2002 | Miyata et al. | 345/419 |
| 6,394,897 B1 | 5/2002 | Togami | |
| 6,400,374 B2 | 6/2002 | Lanier | |
| 6,409,602 B1 | 6/2002 | Wiltshire et al. | 463/42 |
| 6,411,392 B1 | 6/2002 | Bender et al. | 358/1.14 |
| 6,411,744 B1 | 6/2002 | Edwards | |
| 6,417,836 B1 | 7/2002 | Kumar et al. | 345/156 |
| 6,441,825 B1 | 8/2002 | Peters | 345/473 |
| 6,473,516 B1 | 10/2002 | Kawaguchi et al. | 382/100 |
| 6,504,535 B1 | 1/2003 | Edmark | 345/419 |
| 6,516,466 B1 | 2/2003 | Jackson | 725/62 |
| 6,542,927 B2 | 4/2003 | Rhoads | 709/217 |
| 6,545,706 B1 | 4/2003 | Edwards et al. | |
| 6,546,153 B1 * | 4/2003 | Hoydal | 382/285 |
| 6,556,704 B1 | 4/2003 | Chen | 382/154 |
| 6,577,748 B2 | 6/2003 | Chang | 382/100 |
| 6,580,414 B1 | 6/2003 | Wergen et al. | 345/156 |
| 6,580,415 B1 | 6/2003 | Kato et al. | 345/156 |
| 6,593,956 B1 | 7/2003 | Potts et al. | 348/14.09 |
| 6,621,938 B1 | 9/2003 | Tanaka et al. | 382/276 |
| 6,628,265 B2 | 9/2003 | Hwang | 345/156 |
| 6,661,914 B2 | 12/2003 | Dufour | 382/154 |
| 6,676,522 B2 | 1/2004 | Rowe et al. | 463/42 |
| 6,677,967 B2 | 1/2004 | Sawano et al. | 715/839 |
| 6,677,987 B1 | 1/2004 | Girod | 348/171 |
| 6,709,108 B2 | 3/2004 | Levine et al. | 351/211 |
| 6,720,949 B1 | 4/2004 | Pryor et al. | 345/158 |
| 6,749,510 B2 | 6/2004 | Giobbi | 463/42 |
| 6,751,338 B1 | 6/2004 | Wallack | 382/106 |
| 6,753,849 B1 | 6/2004 | Curran et al. | 345/158 |
| 6,767,282 B2 | 7/2004 | Matsuyama et al. | 463/3 |
| 6,769,769 B2 | 8/2004 | Podlleanu et al. | 351/221 |
| 6,774,939 B1 | 8/2004 | Peng | 348/231.4 |
| 6,785,329 B1 | 8/2004 | Pan et al. | 375/240.08 |
| 6,789,967 B1 | 9/2004 | Forester | 400/489 |
| 6,795,068 B1 | 9/2004 | Marks | 345/419 |
| 6,809,776 B1 | 10/2004 | Simpson et al. | 348/565 |
| 6,819,318 B1 | 11/2004 | Geng | 345/420 |
| 6,846,238 B2 | 1/2005 | Wells | 463/39 |
| 6,847,311 B2 | 1/2005 | Li | 341/28 |
| 6,881,147 B2 | 4/2005 | Naghi et al. | 463/35 |
| 6,884,171 B2 | 4/2005 | Eck et al. | 463/42 |
| 6,890,262 B2 * | 5/2005 | Oishi et al. | 463/31 |
| 6,917,688 B2 | 7/2005 | Yu et al. | 381/94.7 |
| 6,919,824 B2 | 7/2005 | Lee | 341/20 |
| 6,924,787 B2 | 8/2005 | Kramer et al. | 345/156 |
| 6,930,725 B1 | 8/2005 | Hayashi | 348/373 |
| 6,931,596 B2 * | 8/2005 | Gutta et al. | 715/728 |
| 6,943,776 B2 | 9/2005 | Ehrenburg | 345/168 |
| 6,945,653 B2 | 9/2005 | Kobori et al. | 353/30 |
| 6,951,515 B2 | 10/2005 | Ohshima et al. | 463/31 |
| 6,952,198 B2 | 10/2005 | Hansen | 345/158 |
| 6,965,362 B1 | 11/2005 | Ishizuka | 345/82 |
| 6,970,183 B1 | 11/2005 | Monroe | 348/143 |
| 7,006,009 B2 | 2/2006 | Newman | 340/854.5 |
| 7,016,411 B2 | 3/2006 | Azuma et al. | 375/240.08 |
| 7,039,199 B2 | 5/2006 | Rui | 381/92 |
| 7,039,253 B2 | 5/2006 | Matsuoka et al. | 382/295 |
| 7,042,440 B2 | 5/2006 | Pryor et al. | 345/158 |
| 7,054,452 B2 | 5/2006 | Ukita | 381/92 |
| 7,059,962 B2 | 6/2006 | Watashiba | 463/2 |
| 7,061,507 B1 | 6/2006 | Tuomi et al. | 345/611 |
| 7,071,914 B1 * | 7/2006 | Marks | 345/156 |
| 7,090,352 B2 | 8/2006 | Kobor et al. | 353/30 |
| 7,098,891 B1 | 8/2006 | Pryor | 345/158 |
| 7,102,615 B2 | 9/2006 | Marks | 345/156 |
| 7,106,366 B2 | 9/2006 | Parker et al. | 348/222.1 |
| 7,116,330 B2 | 10/2006 | Marshall et al. | 345/474 |

| | | | |
|---|---|---|---|
| 7,116,342 B2 | 10/2006 | Dengler et al. ............... 345/630 |
| 7,121,946 B2 * | 10/2006 | Paul et al. ...................... 463/36 |
| 7,139,767 B1 | 11/2006 | Taylor et al. ................. 707/102 |
| 7,148,922 B2 | 12/2006 | Shimada ...................... 348/370 |
| 7,164,413 B2 | 1/2007 | Davis et al. .................. 345/163 |
| 7,183,929 B1 | 2/2007 | Antebi et al. ............. 340/573.1 |
| 7,212,308 B2 | 5/2007 | Morgan ...................... 358/1.18 |
| 7,224,384 B1 | 5/2007 | Iddan et al. ............ 348/207.99 |
| 7,227,526 B2 | 6/2007 | Hildreth et al. ............. 345/156 |
| 7,227,976 B1 | 6/2007 | Jung et al. ................... 382/103 |
| 7,245,273 B2 | 7/2007 | Eberl et al. ................. 351/211 |
| 7,259,375 B2 | 8/2007 | Tichit et al. .............. 250/341.8 |
| 7,274,305 B1 | 9/2007 | Lutrell ................. 340/870.02 |
| 7,283,679 B2 | 10/2007 | Okada et al. ................. 382/260 |
| 7,301,530 B2 | 11/2007 | Lee et al. ..................... 345/158 |
| 7,305,114 B2 | 12/2007 | Wolff et al. ................. 709/200 |
| 7,346,387 B1 | 3/2008 | Wachter et al. ............. 600/476 |
| 7,364,297 B2 | 4/2008 | Goldfain et al. ............. 351/206 |
| 7,379,559 B2 | 5/2008 | Wallace et al. ............. 382/100 |
| 7,446,650 B2 | 11/2008 | Scholfield et al. ........ 340/425.5 |
| 2001/0056477 A1 | 12/2001 | McTernan et al. ........... 709/219 |
| 2002/0010655 A1 | 1/2002 | Kjallstrom .................... 705/27 |
| 2002/0056114 A1 | 5/2002 | Fillebrown et al. ............ 725/78 |
| 2002/0072414 A1 | 6/2002 | Stylinski et al. ............... 463/42 |
| 2002/0075286 A1 | 6/2002 | Yonezawa et al. ........... 345/679 |
| 2002/0083461 A1 | 6/2002 | Hutcheson et al. ............ 725/62 |
| 2002/0085097 A1 | 7/2002 | Colmenarez et al. ........ 348/211 |
| 2002/0094189 A1 | 7/2002 | Navab et al. ..................... 386/4 |
| 2002/0126899 A1 | 9/2002 | Farrell ......................... 382/199 |
| 2002/0134151 A1 | 9/2002 | Naruoka et al. ............... 73/291 |
| 2002/0158873 A1 | 10/2002 | Williamson ................. 345/427 |
| 2003/0014212 A1 | 1/2003 | Ralston et al. .............. 702/150 |
| 2003/0093591 A1 | 5/2003 | Hohl ........................... 710/22 |
| 2003/0100363 A1 | 5/2003 | Ali ............................... 436/30 |
| 2003/0160862 A1 | 8/2003 | Charlier et al. .......... 348/14.08 |
| 2003/0169907 A1 * | 9/2003 | Edwards et al. ............. 382/118 |
| 2003/0232649 A1 | 12/2003 | Gizis et al. ..................... 463/42 |
| 2004/0001082 A1 | 1/2004 | Said ............................ 345/730 |
| 2004/0017355 A1 | 1/2004 | Shim ........................... 345/157 |
| 2004/0063480 A1 | 4/2004 | Wang ............................. 463/8 |
| 2004/0063481 A1 | 4/2004 | Wang ............................. 463/8 |
| 2004/0070565 A1 | 4/2004 | Nayar et al. ................. 345/156 |
| 2004/0087366 A1 | 5/2004 | Shum et al. ................... 463/36 |
| 2004/0095327 A1 | 5/2004 | Lo ............................... 345/169 |
| 2004/0140955 A1 | 7/2004 | Metz ............................ 345/166 |
| 2004/0150728 A1 | 8/2004 | Ogino ......................... 348/239 |
| 2004/0213419 A1 | 10/2004 | Varma et al. .................. 381/92 |
| 2004/0254017 A1 | 12/2004 | Cheng .......................... 463/35 |
| 2005/0037844 A1 | 2/2005 | Shum et al. ................... 463/36 |
| 2005/0047611 A1 | 3/2005 | Mao .......................... 381/94.7 |
| 2005/0088369 A1 | 4/2005 | Yoshioka ..................... 345/60 |
| 2005/0102374 A1 | 5/2005 | Moragne et al. ............ 709/217 |
| 2005/0105777 A1 | 5/2005 | Koslowski et al. .......... 382/115 |
| 2005/0117045 A1 | 6/2005 | Abdellatif et al. ........... 384/335 |
| 2005/0198095 A1 | 9/2005 | Du et al. ...................... 709/200 |
| 2005/0239548 A1 | 10/2005 | Ueshima et al. ................ 463/3 |
| 2006/0035710 A1 | 2/2006 | Festejo et al. ................. 463/36 |
| 2007/0066394 A1 | 3/2007 | Ikeda et al. .................... 463/37 |
| 2007/0120834 A1 | 5/2007 | Boillot ......................... 354/103 |
| 2007/0120996 A1 | 5/2007 | Boillot ......................... 384/345 |
| 2008/0056561 A1 | 3/2008 | Sawachi ...................... 382/154 |

FOREIGN PATENT DOCUMENTS

| | | |
|---|---|---|
| EP | 0652686 | 5/1995 |
| EP | 0750202 | 12/1996 |
| EP | 0 823 683 A1 | 2/1998 |
| EP | 0 869 458 A2 | 10/1998 |
| EP | 1 180 384 A2 | 2/2002 |
| EP | 1 279 425 A2 | 1/2003 |
| EP | 1435258 | 7/2004 |
| FR | 2814965 | 4/2002 |
| GB | 2206716 | 1/1989 |
| GB | 2206716 | 11/1989 |
| GB | 2376397 | 11/2002 |
| GB | 2388418 | 11/2003 |
| JP | 01-284897 | 11/1989 |
| JP | 07-311568 | 11/1995 |
| JP | 9-128141 | 5/1997 |
| JP | 9-185456 | 7/1997 |
| JP | 11-38949 | 2/1999 |
| JP | 2000-172431 | 6/2000 |
| JP | 2000259856 A * | 9/2000 |
| JP | 2000350859 | 12/2000 |
| JP | 2001-166676 | 6/2001 |
| JP | 2002369969 | 12/2002 |
| JP | 2004145448 | 5/2004 |
| JP | 2005046422 | 2/2005 |
| WO | WO9935633 * | 6/1999 |
| WO | WO 99/26198 | 10/1999 |
| WO | WO 02/27456 | 2/2002 |
| WO | WO 03/079179 | 9/2003 |
| WO | WO 2005/073838 | 8/2005 |
| WO | WO 2005107911 | 11/2005 |

OTHER PUBLICATIONS

K. B. Shevioga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (And Elsewhere . . . )", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.holcudai.ac.jp.

Nishida, et al., "A Method of Estimating Human Shapes by Fitting the Standard Human Model to Partial Measured Data", D-II vol. J84-D-11, No. 7, pp. 1310-1318, Jul. 2001.

Wilson & Darrell, "Audio-Video Array Source Localization for Intelligent Environments", 2002 IEEE Dept. of Electrical Eng and Computer Science, MIT, Cambridge, MA 02139.

Fiala, et al., "A Panoramic Video and Acoustic Beamforming Sensor for Videoconferencing", 2004 IEEE, Computational Video Group, National Research Council, Ottawa, Canada K1A 0R6.

Hemmi, et al., "3-D Natural Interactive Interface-Using Marker Tracking from a Single View",Sep. 9, 1991, Systems and Computers in Japan.

Richardson et al., "Virtual Network Computing" IEEE Internet Computing, vol. 2,No. 1 Jan./Feb. 1998.

Fujitsu, "Internet Development of Emulators" Abstract, Mar. 1997, vol. 48, No. 2.

Kanade, et al., "A Stereo Machine for Video-rate Dense Depth Mapping and Its New Application" 1996, CVPR 96, IEEE Computer Society Conference, pp. 196-202 (022).

Gvili, et al., "Depth Keying", SPIE vol. 5006 (2003), 2003 SPIE-IS&T, pp. 564-574 (031).

* cited by examiner

METHOD AND APPARATUS FOR ADJUSTING A VIEW OF A SCENE BEING DISPLAYED ACCORDING TO TRACKED HEAD MOTION

BACKGROUND OF THE INVENTION

1. Field of the Invention

This invention relates generally to video processing, and more particularly to an interface that enables controlling a virtual camera through a user's head motion in order to adjust the view being presented during an interactive entertainment application.

2. Description of the Related Art

The interactive entertainment industry strives to allow users a realistic as possible experience when playing an interactive video game. Currently, the scene views presented on screen during execution of the interactive application do not allow for the definition of a scene view according to actual tracked movement where the movement is captured without the use of markers. The requirement for a user to wear the sometimes awkward markers is a nuisance that has prevented the wide scale acceptance of the applications associated with the markers.

One attempt to provide a realistic experience is to provide a canned response to a detected movement. That is, a user may be monitored and if the user ducks or jumps a corresponding character of the application ducks or jumps. However, there is no correlation with the user's movement to the scene view being presented on display screen viewed by the user. Thus, in order to change a scene view being presented, the user is left with manipulating a joy stick to change the scene view. Moreover, a user is required to remember a number of abstract commands in order to access the various scene movement capabilities. For example, in order to peer around a corner within a scene, the user may have to key a button sequence in combination with manipulation of the joy stick in order to achieve the desired functionality. As can be appreciated, this manipulation is wholly unrelated to the physical movement, i.e., peering around a corner, tying to be emulated.

In view of the foregoing, there is a need for providing a method and apparatus configured to tie the actual movement of a user to modify a scene view being presented, without having the user wear markers, during an execution of an interactive entertainment application.

SUMMARY OF THE INVENTION

Broadly speaking, the present invention fills these needs by providing a method and apparatus that tracks head motion of a user without markers in order to adjust a view-frustum associated with a scene being displayed. It should be appreciated that the present invention can be implemented in numerous ways, including as a method, a system, computer readable medium or a device. Several inventive embodiments of the present invention are described below.

In one embodiment, a method for processing interactive user control with a scene of a video clip is provided. The method initiates with identifying a head of a user that is to interact with the scene of the video clip. Then, the identified head of the user is tracked during display of the video clip, where the tracking enables detection of a change in position of the head of the user. Next, a view-frustum is adjusted in accordance with the change in position of the head of the user.

In another embodiment, a method for processing interactive user control with a scene of a video clip is provided. The method initiates with identifying a head of a user that is to interact with the scene of the video clip. Then, the identified head of the user is tracked during display of the video clip, where the tracking enables detection of a change in position of the head of the user. Next, a view-frustum is translated in accordance with the change in position of the head of the user.

In still another embodiment, a method for managing a visible volume displayed through a view port is provided. The method initiates with locating a head of a user. Then, a location of the head of the user is tracked relative to the view port. Next, the visible volume is adjusted based upon the location of the head of the user relative to the view port.

In another embodiment, a computer readable medium having program instructions for processing interactive user control with a scene of a video clip is provided. The computer readable medium includes program instructions for identifying a head of a user that is to interact with the scene of the video clip. Program instructions for tracking the identified head of the user during display of the video clip, the tracking enabling detection of a change in position of the head of the user and program instructions for adjusting a view-frustum in accordance with the change in position of the head of the user are included.

In yet another embodiment, a computer readable medium having program instructions for processing interactive user control with a scene of a video clip is provided. The computer readable medium includes program instructions for identifying a head of a user that is to interact with the scene of the video clip. Program instructions for tracking the identified head of the user during display of the video clip, the tracking enabling detection of a change in position of the head of the user and program instructions for translating a view-frustum in accordance with the change in position of the head of the user are included.

In still yet another embodiment, a computer readable medium having program instructions for managing a visible volume displayed through a view port is provided. The computer readable medium includes program instructions for locating a head of a user. Program instructions for tracking a location of the head of the user relative to the view port and program instructions for adjusting the visible volume based upon the location of the head of the user relative to the view port are included.

In another embodiment, a system enabling interactive user control for defining a visible volume being displayed is provided. The system includes a computing device. A display screen in communication with the computing device is included. The display screen is configured to display image data defined through a view-frustum. A tracking device in communication with the computing device is included. The tracking device is capable of capturing a location change of a control object, wherein the location change of the control object effects an alignment of the view-frustum relative to the display screen.

In yet another embodiment, a computing device is provided. The computing device includes a memory configured to store a template of a control object. A processor capable of receiving a video signal tracking the control object is included. The processor includes logic for comparing a portion of a frame of the video signal to the template, logic for identifying a change in a location of the control object in the portion of the frame relative to a location of the control object associated with the template, and logic for translating the change in the location of the control object to adjust a view-frustum associated with an original location of the control object.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

An invention is disclosed for adjusting a point of view for a scene being displayed during an interactive entertainment application according to the head movement of a user. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

The embodiments of the present invention modify a point of view associated with a virtual camera during an interactive entertainment application through the marker-less tracking of a control object. Thus, the visible scene being presented on a display screen is effected to the actual movement of the control object. That is, the control object is tracked and the movement of the control object is translated to modify a view-frustum defining a visible scene presented on a display screen. For illustrative purposes, the embodiments described herein designate the control object as a user's head. Of course, certain features of a user's head may be tracked, e.g., the face or any other suitable facial feature. Accordingly, rather than using a joy stick controller to move a virtual camera that defines the point of view for the visible scene being presented, a change in the coordinates of a user's head, that is being tracked through an image capture device, results in defining a new view point and subsequently displaying the image data associated with the new view point. As mentioned above, the tracking of the control object is performed without markers affixed to the control object. Thus, the user is not required to wear a device for tracking purposes. One skilled in the art will appreciate that the image capture device may be any suitable camera, e.g., a web camera.

In one embodiment, the physical movement in the real world, that is associated with the control object being tracked, is transformed to a virtual movement of a virtual camera defining a visible scene. The visible scene in the virtual world is then displayed through a virtual window, then rendered onto a rectangular area with screen coordinates, referred to as the view port. As used herein, the view port may any suitable display screen, e.g., a television monitor, a computer monitor, etc. While the embodiments described herein refer to a video game application, the embodiments may be applied to any suitable interactive entertainment application. Accordingly, with respect to a video game application any suitable video game console, such as the "PLAYSTATION 2"® manufactured by Sony Computer Entertainment Inc. may be incorporated with the embodiments described below. However, the embodiments including a video game console may also include any suitable computing device in place of the video game console. For example, with reference to on-line gaming applications, the computing device may be a server.

In one embodiment, a video camera is set proximate to a graphical display and pointed at the user to detect user movements. In particular, a change in location associated with the user's head or face is detected by the video camera. Each frame of video is processed to locate the position of the user's head in the image, by matching a portion of the video frame with a face template captured from a specific user, or a canonical face template. The face template is initially captured by the user placing his face within a capture region defined on a display screen. Once the user's face is within the capture region the system is signaled so that an image of the user's face may be stored as gray scale image data or some other suitable image data for storage in memory. The virtual viewpoint and view frustum used for displaying the scene are modified to correspond to the user's tracked head or face location during execution of an interactive entertainment application. In addition, distance of the user's head from the camera may be determined from the scale of their face/head features in the video image. The mapping from the head location to the virtual view is dependent on the application.

For example, a game developer may decide on the factors defining the mapping of the head location to the virtual view.

Figure 1:
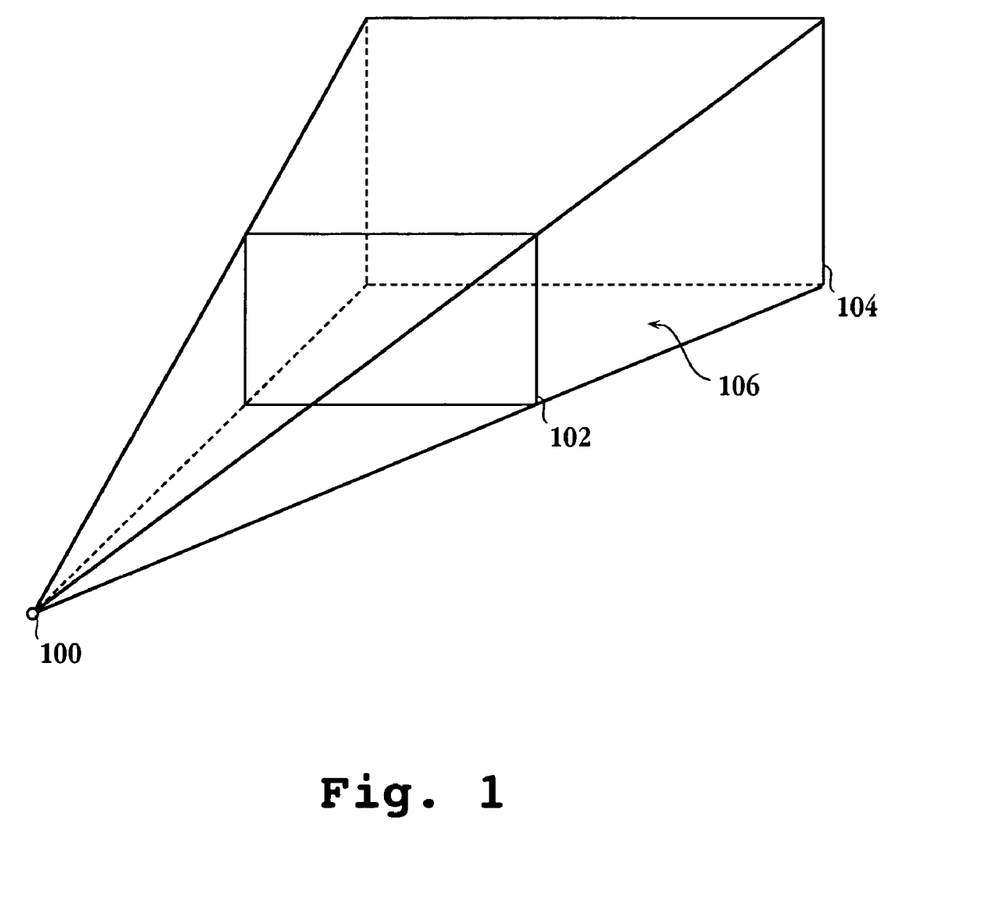
FIG. 1 is a simplified schematic diagram illustrating a view-frustum.

FIG. 1 is a simplified schematic diagram illustrating a view-frustum. As is generally known, the view-frustum is used to define viewable objects for presentation. Thus, from viewpoint 100 a pyramid is defined. View-frustum 106 is bounded by the four sides of the pyramid having an apex at viewpoint 100. View-frustum 106 may be thought of as a truncated pyramid where near plane 102 clips the pyramid defined from viewpoint 100 at a front end, i.e., closer to the viewpoint. Far plane 104 clips the pyramid at a far end. Thus, view-frustum 106 defines a truncated pyramid volume, wherein the visible volume for display through a view port is defined within the truncated pyramid volume of view frustum 106. One skilled in the art will appreciate that the view-frustum enables objects defined in three-dimensional space to be culled in order to present the visible objects on a two-dimensional screen. Consequently, plane 102 may be considered a virtual display screen, i.e., a view port, in which objects defined within view-frustum 106 are presented.

Figure 2:
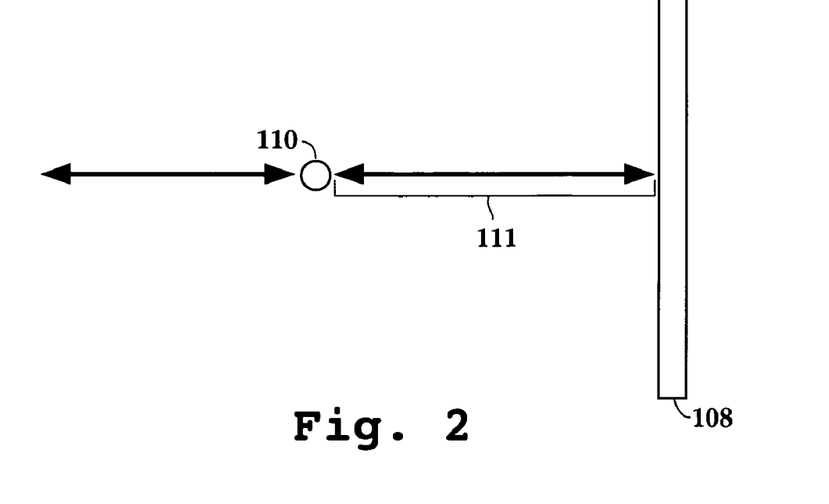
FIG. 2 is a simplified schematic diagram illustrating a virtual space viewpoint which is capable of being set by an application developer in accordance with one embodiment of the invention.

FIG. 2 is a simplified schematic diagram illustrating a virtual space viewpoint which is capable of being set by an application developer in accordance with one embodiment of the invention. Viewpoint 110 is associated with a particular distance to virtual window 108. As a result of that distance, the scene being presented through virtual window 108 may be modified. In other words, distance 111 may be used to define a scale of a scene being displayed in virtual window 108. As can be seen, viewpoint 110 may be moved closer to or farther from virtual window 108 in order to manipulate the scene being presented. With reference to video game applications, distance 111 is set by a game developer or programmer as desired. Thus, distance 111 may be manipulated to provide the effect of being right up against virtual window 108, a significant distance away from virtual window 108, or any distance in between. For example, with respect to a video game application, a character running may be associated with a distance being relatively close to virtual window 108 in order to see the ground directly in front of the character. Alternatively, an application displaying a view from an airplane in flight, may be associated with a large distance to provide the effect of a global view.

Figure 3:
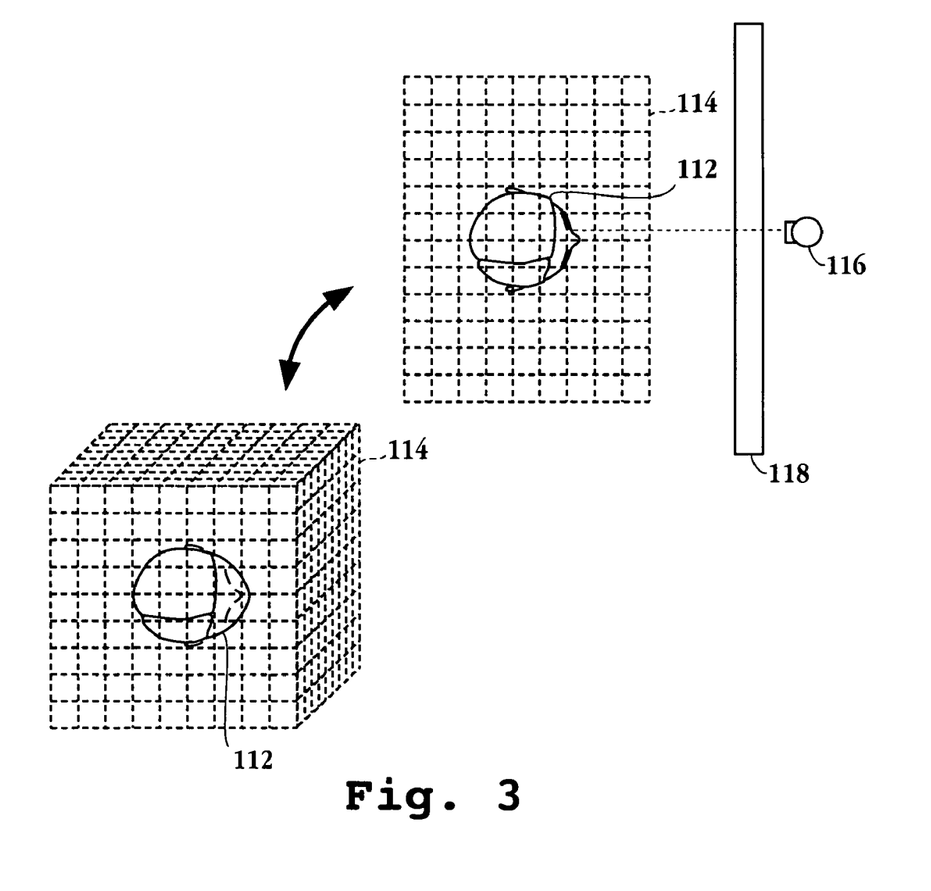
FIG. 3 is a simplified schematic diagram illustrating a top view of a world space configuration where a user's relative position within a three-dimensional cube is used to effect a scene being presented during an interactive entertainment application in accordance with one embodiment of the invention.

FIG. 3 is a simplified schematic diagram illustrating a top view of a world space configuration where a user's relative position within a three-dimensional cube is used to effect a scene being presented during an interactive entertainment application in accordance with one embodiment of the invention. Here, image capture device 116 is configured to track control object 112, e.g., a user's head or face region, within a capture zone defined by three-dimensional cube 114. As will be explained in more detail below, image capture device 116 is in communication with a computing device controlling the image data, i.e., the scenes, being presented on display screen 118. Thus, as control object 112 moves within the capture zone the change in location captured by image capture device 116 is translated in order to effect a corresponding change to a view-frustum defining the visible scene being presented on display screen 118. For example, the pyramid discussed with reference to FIG. 1 having an apex associated with control object 112 defines a view-frustum. As will be described in more detail below, the movement of control object 112 causes a scene view being presented to change relative to the movement of the control object. In one embodiment, image capture device 116 is configured to zoom-in on various quadrants of three-dimensional cube 114 in order to locate where head 112 is relative to the three-dimensional volume. It should be appreciated that image capture device 116 may be any suitable camera capable of tracking a user's head within a capture zone. It should be further appreciated that the tracking is performed through a marker-less scheme.

Still referring to FIG. 3, in one embodiment, image capture device 116 is a depth camera. For example, the depth camera discussed in U.S. application Ser. No. 10/365,120 entitled "Method and Apparatus for Real Time Motion Capture," is an exemplary depth camera capable of determining a distance of control object 112 to display screen 118. This application is herein incorporated by reference in its entirety for all purposes. Thus, the view being displayed on display screen 118 may be modified in response to movement within capture zone 114 of control object 112. Additionally, the scale associated with the image data being displayed may be manipulated according to a change in the distance of the user's head to the display screen. In another embodiment, an image capture device without depth capability may be used, where control object 112 is a user's head or facial region, and where the size of a face associated with the user's head is compared in successive video frames in order to translate a change in the distance from the user's head to the display screen. For example, a change in size of the user's head, or another suitable control object, within a range of about 15% in the successive video frames may be used to manipulate the scale of a scene being presented on display screen 118. One skilled in the art will appreciate that the use of an image capture device 116 where the image capture device does not have depth capability will require a more powerful processor as compared to the use of a depth camera.

Figure 4:
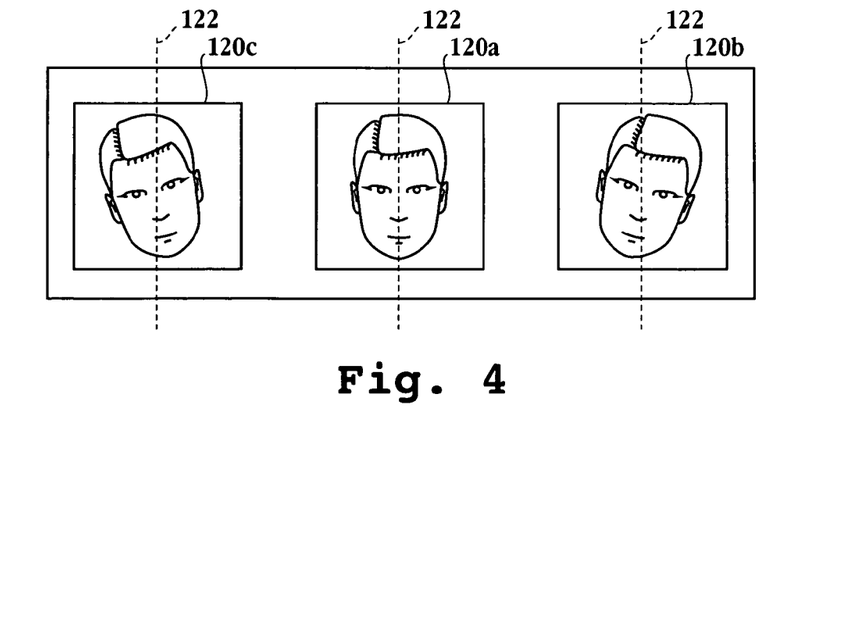
FIG. 4 is a simplified schematic diagram illustrating alternative facial orientations generated for a system configured to adjust a point of view being displayed according to a user's head movement in accordance with one embodiment of the invention.

FIG. 4 is a simplified schematic diagram illustrating alternative facial orientations generated for a system configured to adjust a point of view being displayed according to a user's head movement in accordance with one embodiment of the invention. Here, image 120a is initially captured as the template of a user's head. Upon the capture of image 120a, associated images 120b and 120c are generated where the facial orientation is rotated relative to axis 122. That is, image 120b is created by tilting the face of image 120a in one direction, while image 120c is created by tilting the face of image 120a in a different direction, thereby identifying additional three dimensional positions of the head. One skilled in the art will appreciate that numerous other templates may be generated where the orientation or size of the face is modified from the original template. Additionally, any suitable orientation change or size change from the original captured image may be generated. In one embodiment, a degree of change in the orientation or size is determined for use in modifying a scene view.

Figure 5:
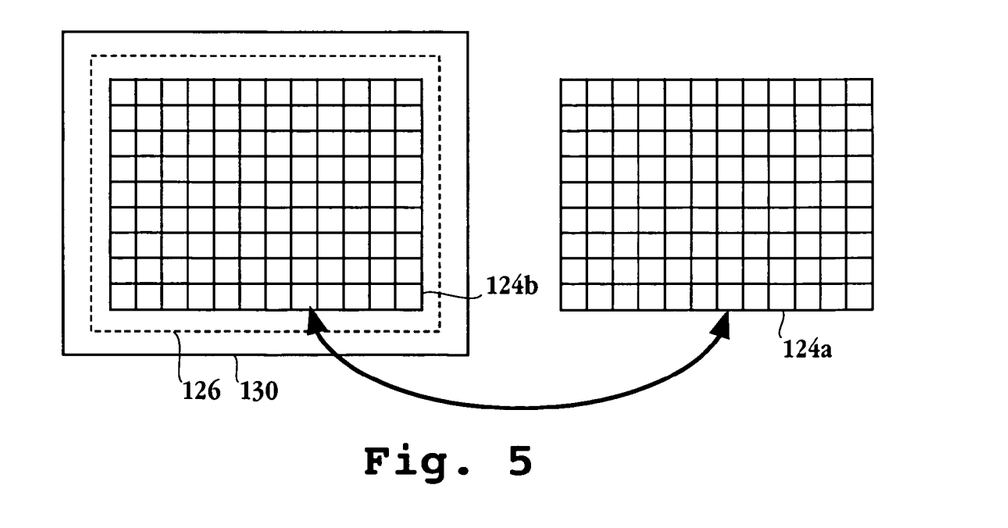
FIG. 5 is a simplified schematic diagram illustrating the generation of a template and the corresponding matching of the template to a region within a frame of video data in accordance with one embodiment of the invention.

FIG. 5 is a simplified schematic diagram illustrating the generation of a template and the corresponding matching of the template to a region within a frame of video data in accordance with one embodiment of the invention. Here, template 124a is created upon initialization as described above. In one embodiment, template 124a is a 12×16 pixel size region. Region 130 represents a frame of video data. Within the frame of video data search region 126 is defined. In one embodiment, a size associated with search region 126 is determined by how far, in terms of pixels, a user can move between frames. For example, if a user moves eight pixels in between frames, the size of search region 126 is configured to accommodate this movement so that the movement may be captured. Thus, in one embodiment, each frame of video data is searched within the search region in order to locate a match between the template defined in search region 126 and stored template 124a, thereby enabling computation of a change in movement of a user. In another embodiment, a match is found for template 124a, which is stored in memory as described above, and a corresponding region 124b within search region 126 through a sum of absolute differences scheme also referred to as an L1 norm calculation. That is, values associated with each pixel of template 124a are subtracted from corresponding pixels within an area defined in search region 126 in order to locate an area within the search region that generates the lowest score when compared to template 124a. For example, corresponding pixel values from template 124a and region 124b are subtracted from each other. The absolute value of each of the differences is then taken and summed in order to obtain a score associated with the comparison of template 124a and region 124b. The corresponding region within search area 126 having the lowest score when compared to template 124a is the most likely candidate for a match. In one embodiment, a threshold score must be obtained in order for the region within search area 126 to be considered a match to template 124a. In one embodiment, if no match is found, then the location of the control object defaults to a location determined within a previous frame. One skilled in the art will appreciate that the comparison through the sum of absolute differences is provided for exemplary purposes only and is not meant to be limiting. That is, other suitable techniques such as taking the square of the differences may also be used in order to calculate the score. In essence, any technique which generates a positive value from each of the differences may be used to calculate the score.

Still referring to FIG. 5, in one embodiment, the image data to determine a match are gray scale luminance values associated with each of the pixels of the corresponding image data. It will be apparent to one skilled in the art that other suitable values associated with the pixels may also be used for the calculation to determine a match to template 124a. It should be appreciated that search region 126 may be set to a new default location within display region 130 during the execution of the interactive entertainment application. In addition, the image data used for the template may be dynamic in order to enhance the tracking of the user's facial features. Thus, when tracking the facial region of a user's head, should the user turn his face from the capture device, the image data captured when the facial region was lost may be tracked in substitution of the initial facial region.

Figure 6A:
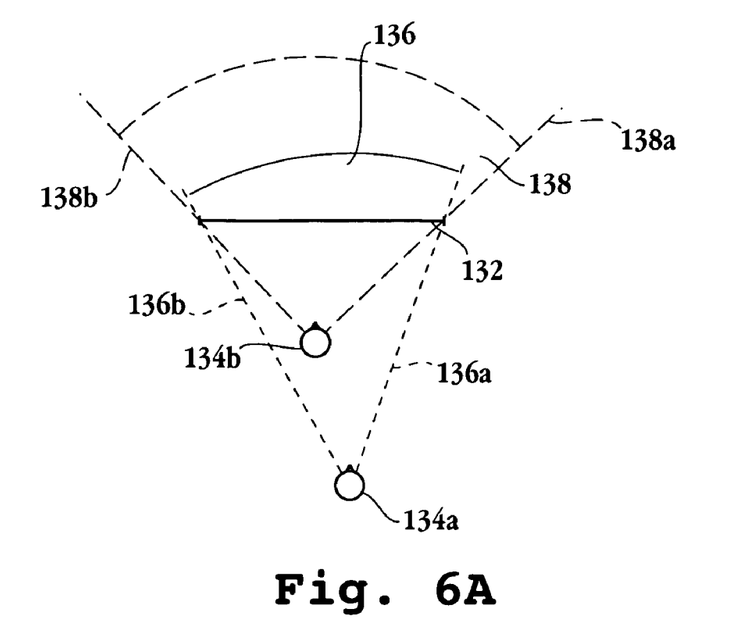
FIG. 6A and FIG. 6B are simplified schematic diagrams illustrating a change in a view-frustum according to a change in a location of a control object relative to a view port in accordance with one embodiment of the invention
Figure 6B:
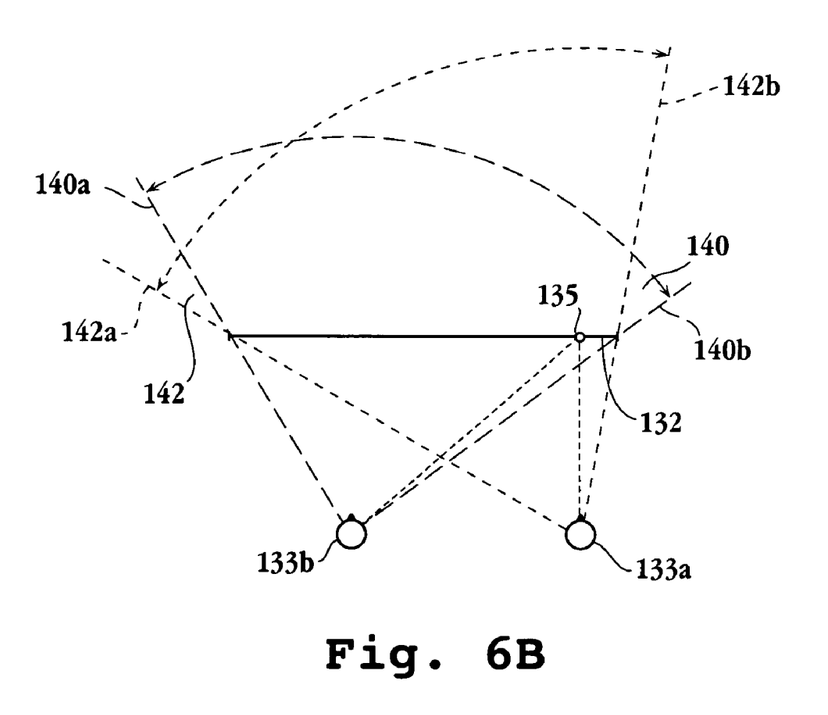

FIGS. 6A and FIG. 6B are simplified schematic diagrams illustrating a change in a view-frustum according to a change in a location of a control object relative to a view port in accordance with one embodiment of the invention. In FIG. 6A, the user's head 134a is tracked at an initial position, thereby defining a view-frustum defining visible volume 136 which is behind view port 132 and between side boundaries 136a and 136b. (I.e., the triangular gaze projection of the control object set between the edges of view port 132 initially defines the view-frustum.) Should the user's head move closer to view port 132, as illustrated by location 134b of the user's head, the associated view-frustum is modified. That is, view-frustum 138, which is defined behind view port 132 and between side boundaries 138a and 138b, provides a wider angle of view behind relative to view-frustum 136. It should be appreciated that this effect may be analogized to looking out a window. That is, the farther a person is from the actual window the view angle will be more limited.

FIG. 6B illustrates the movement of a view-frustum from side to side in an asymmetric manner in accordance with one embodiment of the invention. Here, the user's head is initially in location 133a, thereby defining view-frustum 142 behind view port 132 and between side boundaries 142a and 142b. As the location of the user's head moves to location 133b, the boundaries of view-frustum 140 are modified as compared to view-frustum 142. That is, the user in location 134b has a wider angle of sight through the right-hand side of view port 132 as defined by side boundary 140b. However, a more limited angle of sight through the left-hand side of view port 132 is associated with view frustum 140 through side boundary 140a. It should be appreciated that with reference to FIG. 6B, view-frustum 142 defines a symmetrical view-frustum. That is, the line of sight from a user's head at location 133a is normal to a center point 135 of the plane defined by view port 132. However, as the user's location is moved to location 133b the view-frustum is adjusted as described above and becomes asymmetrical. As such, the eye-gaze direction from location 134b is not normal relative to a center of view port 132. In other words, the view plane is no longer perpendicular to the gaze direction, which is atypical for views provided through video games. The display may be considered as a virtual window into a scene, wherein the embodiments described above adjust the view-frustum to show what a user can see through this window as his head moves. It should be appreciated that this provides a parallax effect but also a change in viewing angle.

Figure 6C:
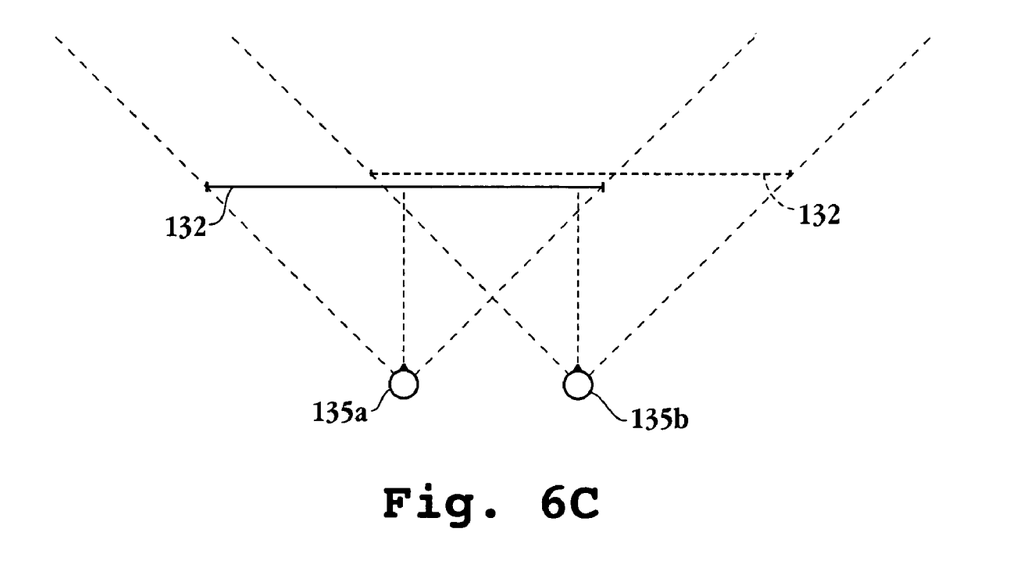
FIG. 6C is a simplified schematic diagram illustrating the translation of a view frustum with a control objects motion, thereby providing a parallax effect in accordance with one embodiment of the invention.

FIG. 6C is a simplified schematic diagram illustrating the translation of a view frustum with a control objects motion, thereby providing a parallax effect in accordance with one embodiment of the invention. Here, as a user's head, or a facial feature of the user's head, moves from location 135a to 135b, the perpendicular angle of gaze direction to a center point of the corresponding view port is maintained. Thus, it appears as viewpoint 132 is translated along with the change in location of the user's head, which may be referred to as strafing. It should be appreciated that visible volume captured through the corresponding view frustums of locations 135a and 135b changes as the boundaries of the corresponding view frustums move. In one embodiment, a user's head moving up and down is tracked to cause the game's view frustum to provide a different viewpoint while maintaining a symmetrical view-frustum. One skilled in the art will appreciate that it is important to maintain the virtual camera direction as described in the embodiment of FIG. 6c for peering around a corner such as in a stealth or first person shooter game. One skilled in the art will appreciate that a TV screen acting as view port 132 may be viewed much larger than it actually is relative to the entire visual field of the user in order to provide a bigger window for the user so that a user does not feel they are looking through a tiny window.

Figure 7A:
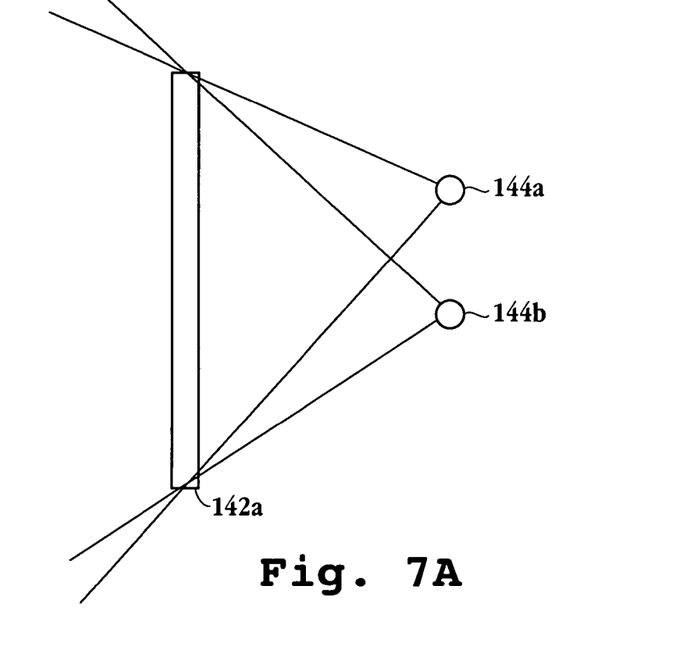
FIGS. 7A and 7B illustrate simplified schematic diagrams comparing virtual world views with real world views in accordance with one embodiment of the invention.
Figure 7B:
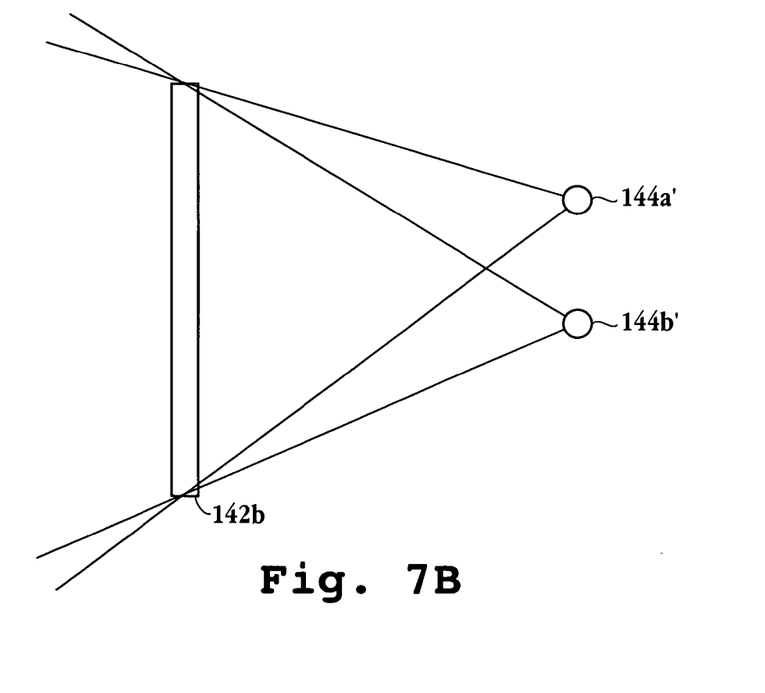

FIGS. 7A and 7B illustrate simplified schematic diagrams comparing virtual world views with real world views in accordance with one embodiment of the invention. In FIG. 7A, a virtual world view defined by view-frustums originating from locations 144a and 144b through virtual view port 142a. In FIG. 7B, real world views are defined by view-frustums associated with location 144a' and 144b' through view port 142b. It should be appreciated that location 144a in the virtual world corresponds to location 144a' in the real world. Likewise, location 144b corresponds to location 144b'. Furthermore, with respect to video game applications or any other interactive entertainment applications, view port 142b may be considered a television screen or any other suitable type of display screen. For FIG. 7A, a virtual camera is associated with locations 144a and 144b. In real world configuration of FIG. 7B, a tracking device such as a camera tracks movement of the user's head from initial location 144a' to a next location 144b'. This movement is interpreted in the real world as set by code developers for that scene. A physical movement in the real world of FIG. 7B is then transformed or mapped into virtual movement in the virtual world of FIG. 7A in order to move the virtual camera to define a scene to be displayed on view port 142b in the real world. It should be appreciated that the scale of movement does not necessarily match between the real world and the virtual world. However, the user is provided with the impression of control over the view movement during execution of the interactive entertainment application.

Figure 8:
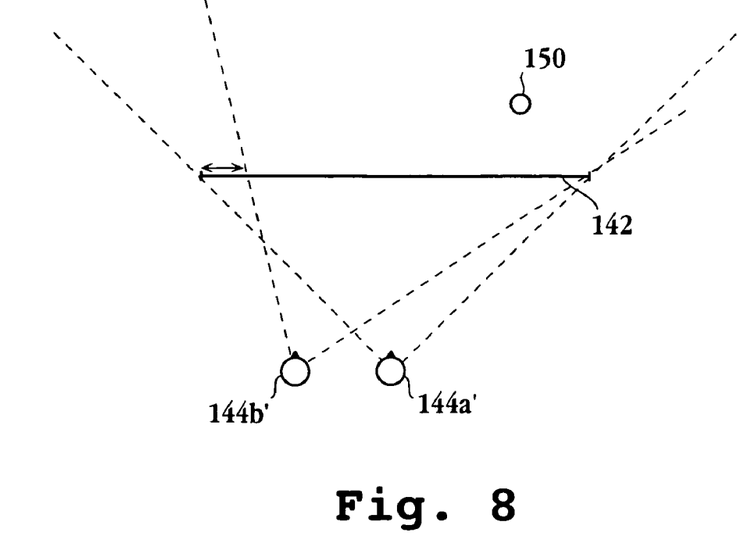
FIG. 8 is a simplified schematic diagram illustrating view-frustums configured to maintain an object location constant within a view port in accordance with one embodiment of the invention.

FIG. 8 is a simplified schematic diagram illustrating view-frustums configured to maintain an object location constant within a view port in accordance with one embodiment of the invention. Here, object 150 defines a center of interest point. That is, the view-frustums associated with various locations, such as locations 144a' and 144b' relative to view port 142 center around object 150. Thus, object 150 appears at a constant position in the scene from the different locations 144a' and 144b'. For example, in a game, if there is a statue that is important for some reason, then the configuration described above enables the statue to be maintained at the center point or point of interest of the scene. Therefore, the user's attention is drawn to the statue even though the scene presentation may not be physically correct. As illustrated in FIG. 8, in order to maintain the relative position of object 150, the size of view port 142 is adjusted.

Figure 9:
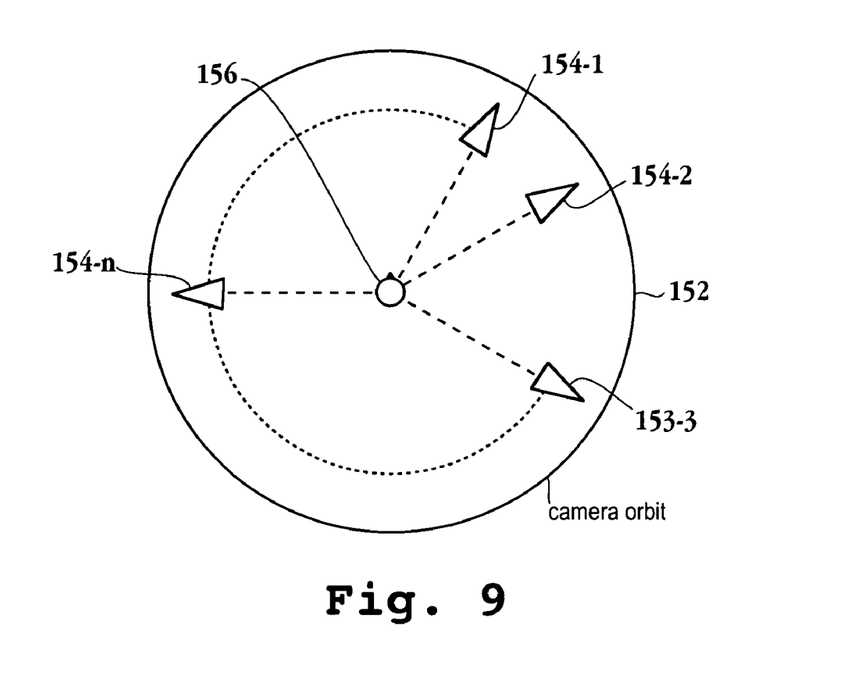
FIG. 9 is a simplified schematic diagram illustrating a view port rotation scheme where an object is viewed from different angles in accordance with one embodiment of the invention.
Figure 10:
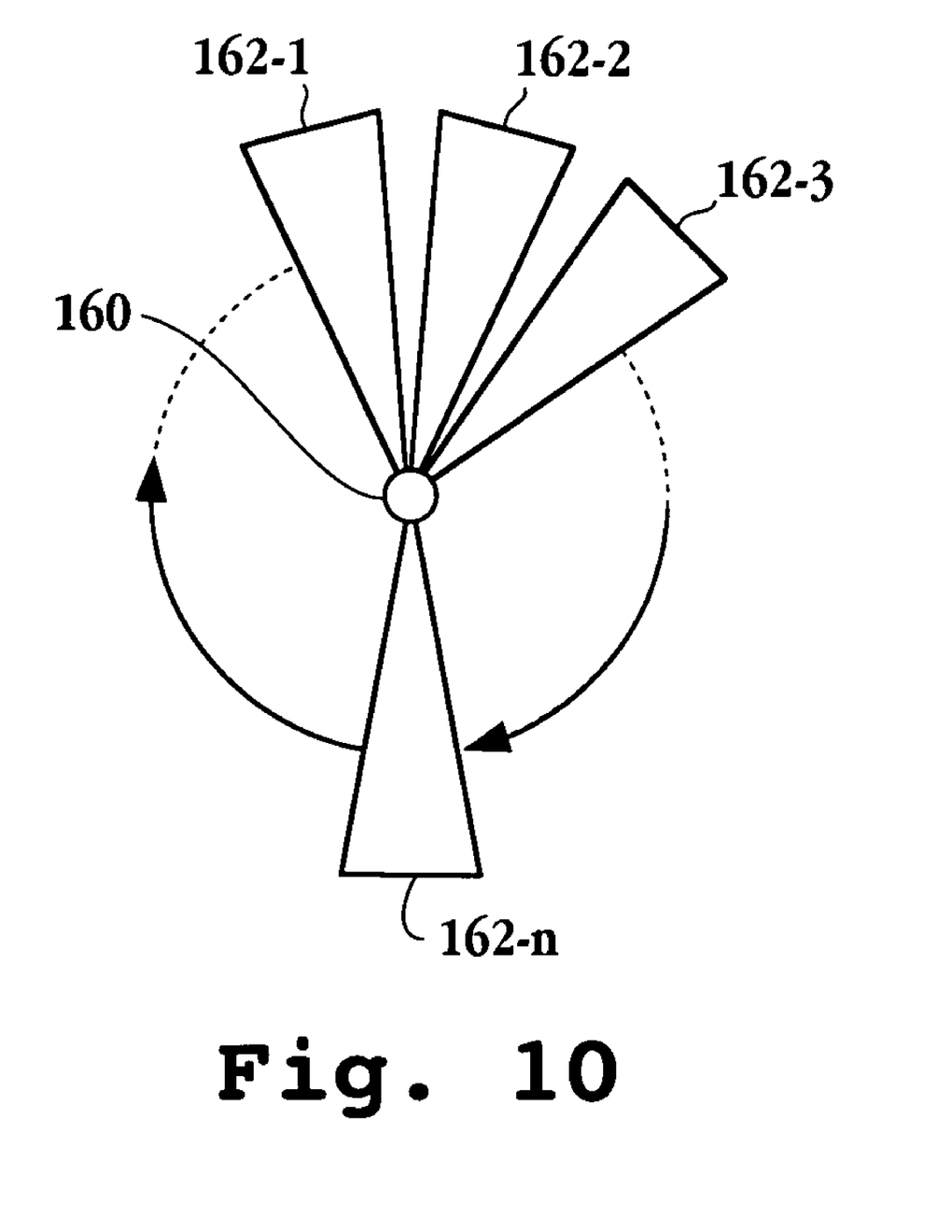
FIG. 10 is a simplified schematic diagram illustrating a scheme where a user's head stays in a fixed location but a view-frustum is rotated according to how the user's head moves I accordance with one embodiment of the invention.

FIG. 9 is a simplified schematic diagram illustrating a view port rotation scheme where an object is viewed from different angles in accordance with one embodiment of the invention. Here, the virtual camera orbits around path 152 in order to define the plurality of view-frustums 154-1 to 154-n, which provide views of object 156 at various angles. Thus, this embodiment may be used when looking over a person's shoulder, or as a person moves around path 152 relative to object 156, i.e., directing an orbiting camera in a $3^{rd}$ person game. FIG. 10 is a simplified schematic diagram illustrating a scheme where a user's head stays in a fixed location but a view-frustum is rotated according to how the user's head moves. For example, the user's head may tilt or twist within a location thereby defining different view-frustums. Here, view-frustums 162-1 through 162-n are defined around location 160 which corresponds to a user's head. In this embodiment, a user provided with the capability of looking around a cockpit for flight simulation applications or out of side windows of a vehicle during driving simulation applications.

Figure 11:
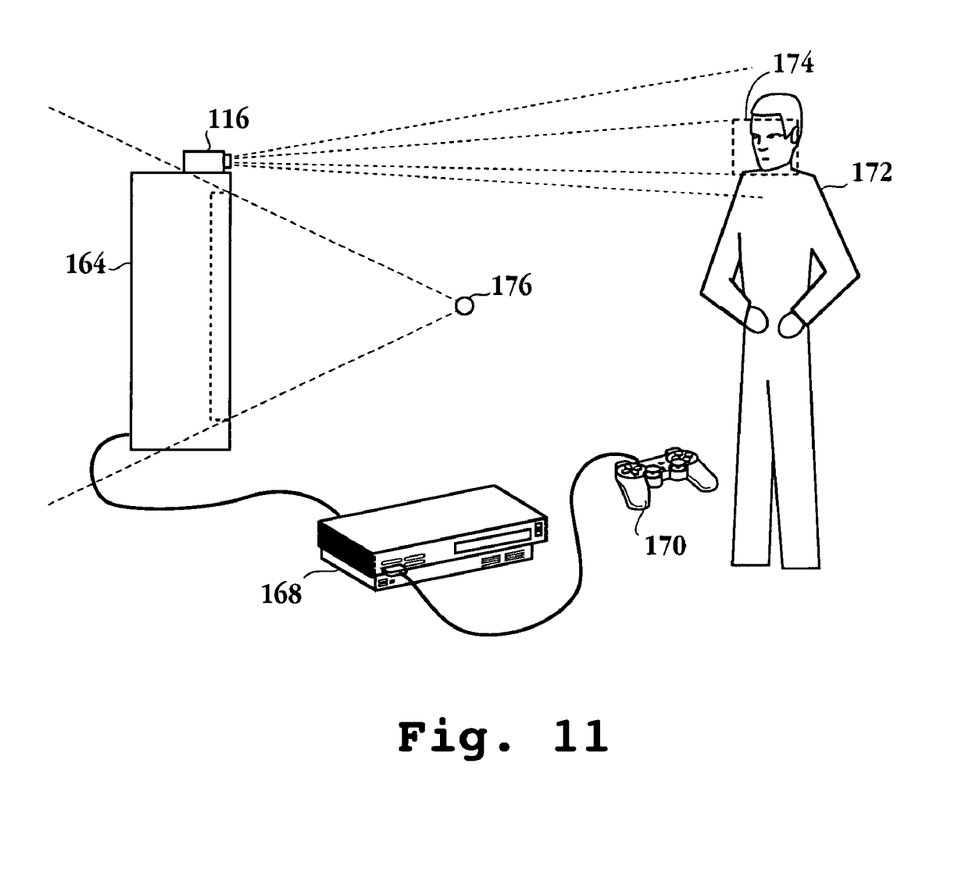
FIG. 11 is a simplified schematic diagram illustrating the system configured to enable interactive user control to define a visible volume being displayed in accordance with one embodiment of the invention.

FIG. 11 is a simplified schematic diagram illustrating the system configured to enable interactive user control to define a visible volume being displayed in accordance with one embodiment of the invention. Here, display device 164 is in communication with computing device 168 which includes a controller 170. Camera 116 is configured to monitor user 172. That is, as user 172 moves, camera 166 tracks a location of the movement of the facial region 174 of the user as described above. A position of virtual camera 176 capturing a scene being presented is adjusted in response to the movement of the facial region, thereby modifying the scene presented through display device 164. For example, camera 116 may be configured to track a user's head located through comparison with a template which is stored in memory of computing device 168. Computing device 168 compares the template to video frame data captured through camera 116 as described with reference to FIG. 5. For example, if user 172 moves his head to peer around a corner, virtual camera 176 is adjusted to provide a view on display device 164 providing a scene of what is around the corner.

Figure 12:
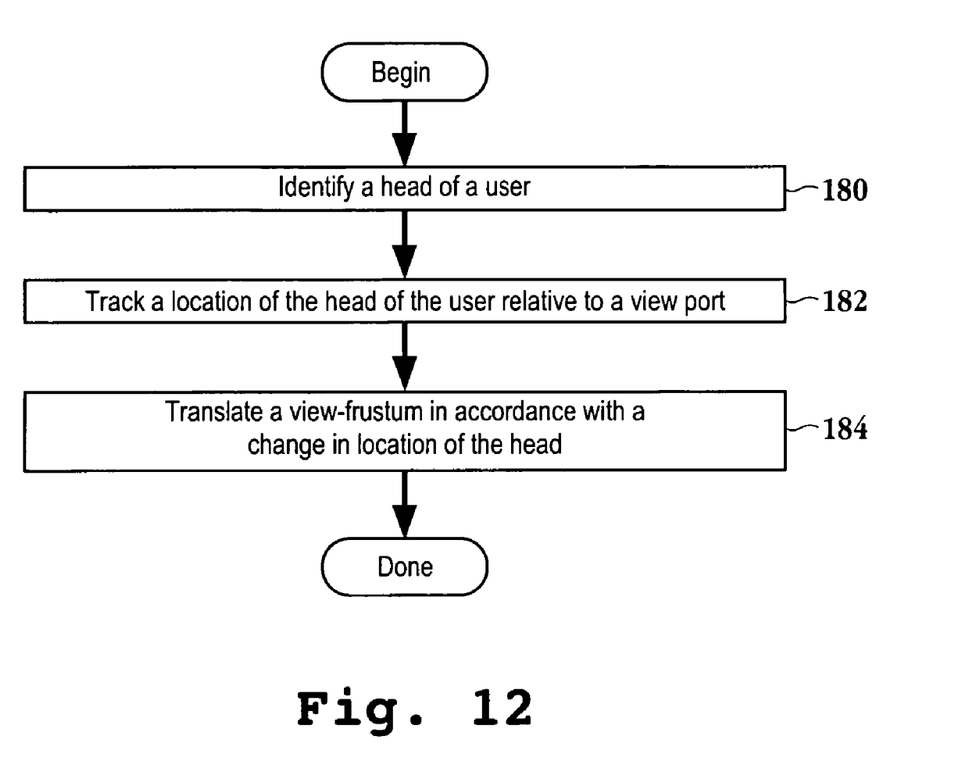
FIG. 12 is a flow chart diagram illustrating method operations for managing a visible volume display through a view port in accordance with one embodiment of the invention.

FIG. 12 is a flow chart diagram illustrating method operations for managing a visible volume display through a view port in accordance with one embodiment of the invention. The method initiates with method operation 180 where a head of the user is identified. For example, the head of the user may be initialized as described above in order for a template to be generated of the head of the user for use as described below. In one embodiment, the initialization of the head of the user captures a gray scale image of the head of the user and stores that image in memory. The visible volume may be a portion of a view-frustum that defines a scene for presentation as described with reference to FIG. 1. The method then advances to operation 182 where a location of the head of the user is tracked relative to a view port. For example, as a user tilts, rotates or moves their head from one location to another, the new location or orientation is tracked relative to a view port. As described above, a view port may be a television screen or any other suitable display screen. Additionally, the movement of the head of the user is captured through a camera that may or may not have depth capturing capability. The method then advances to operation 184 where a view-frustum is translated in accordance with a change in location of the head. Any number of translations of the view-frustum may be used as described above with reference to FIGS. 7 through 10. Additionally, while a template of a head is used for tracking purposes, one skilled in the art will appreciate that numerous other schemes may be incorporated in place of the template of the head. For example, any suitable marker-less scheme that determines where a user's head may be utilized. In one embodiment, the relative distance of the user's head to a view port is also tracked to adjust a scale associated with scene being presented.

In summary, the above described embodiments enable the tracking of a user's head in order to move a point of view to correlate to the head movement. The tracking is performed without markers, thereby freeing previous restrictions on a user, especially with reference to virtual reality applications. While exemplary applications have been provided for viewing control applications, it should be appreciated that numerous other suitable applications may use the embodiments described herein. For example, additional specific uses include: directing the view change in a 3D cut-scene, movie or replay; judging distances using the depth-cue provided by head-motion parallax, e.g., what distance to jump in a platformer game; a scary effect of restricting the normal field of view, e.g., showing the small area visible with a flashlight, and requiring the user to move their head to see more; and using head motion as a trigger for events related to the user's view, such as, triggering a warping effect when a user looks over a precipice to indicate vertigo, and triggering a game character's reaction when you look at something. In another embodiment, a sniper mode may be provided where the virtual camera is finely moved according to fine movements of the user's head, similar to peering through the crosshairs of a rifle when aiming the rifle.

It should be appreciated that the embodiments described herein may also apply to on-line gaming applications. That is, the embodiments described above may occur at a server that sends a video signal to multiple users over a distributed network, such as the Internet, to enable players at remote noisy locations to communicate with each other. It should be further appreciated that the embodiments described herein may be implemented through either a hardware or a software implementation. That is, the functional descriptions discussed above may be synthesized to define a microchip configured to perform the functional tasks for locating and tracking a user's head or facial region and translating the tracked movement to define a scene for presentation.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for processing interactive user control for a view of a scene displayed on a virtual window, comprising:
   identifying a head of a user that is to interact with the scene;
   storing an initial frame of user image data representing the head of the user, said view of the scene comprises a view-frustum initially defined by a gaze projection of a location of the head through outer edges of the virtual window when the location of the head is substantially normal to about a center point of the virtual window;
   tracking the identified head of the user during display of the scene, the tracking enabling detection of a change in location of the head of the user, the tracking including,
      identifying a search region within a frame of the user image data; and
      comparing values within the search region to template values of the stored initial frame of image data;
   adjusting the view-frustum in accordance with the change in location of the head of the user, the adjusting of the view-frustum being in response to tracking a move in the location of the head away from normal relative to the center point of the virtual window, the adjusted view-frustum defined by an updated gaze projection of the changed location of the head through the outer edges of the virtual window, such that the view-frustum moves in a direction opposite to the move in the location of the head;
   adjusting a scale of the scene according to a change in a distance of the head of the user from a capture device; and
   repeating the identifying the search region, the comparing, and the adjusting for successive frames of the scene, wherein the comparing is performed with the stored initial frame of image data.

2. The method of claim 1, wherein successive frames are compared to determine a relative distance of the head of the user to manipulate the scale of the scene.

3. The method of claim 1, wherein the capture device has depth capturing capability.

4. The method of claim 1, wherein the initial frame of image data is marker-less.

5. The method of claim 1, wherein the initial frame of data is maintained throughout the scene.

6. The method of claim 1, wherein the scene is of a video game.

7. The method of claim 6, wherein the interaction with the scene by tracking movement of the head of the user is independent of user hand-held controls for interacting with the video game.

8. The method of claim 1, wherein the method operation of tracking the identified head of the user during display of the scene includes,
   tracking a facial portion of the head; and
   matching gray scale image data associated with the facial portion to image associated with a template of the facial portion.

9. A method for processing interactive user control with a scene, comprising:
   identifying a head of a user that is to interact with the scene;
   storing an initial frame of image data representing the head of the user for a duration of the scene;
   tracking the identified head of the user during display of the scene, the tracking enabling detection of a change in location of the head of the user, the tracking including,
      identifying a search region within a frame of the image data; and
      comparing values within the search region to template values of the initial frame of image data;
   translating a view-frustum in a direction opposite to the change in location of the head of the user while maintaining a focus on an object in the scene through adjustment of a view port size;
   adjusting a scale of the scene according to a change in a distance of the head of the user from a capture device; and
   successively updating the view frustum according to the change in location of the head of the user relative to the initial frame of image data.

10. The method of claim 9, wherein a view-frustum is defined by a gaze projection of a location of the head through outer edges of a virtual window when the location of the head is normal to a center point of the virtual window.

11. The method of claim 10, wherein translating the view-frustum maintains the virtual location of the head normal to the center point of the virtual window.

12. The method of claim 10, wherein the translating enables a change in the scene provided through the virtual window.

13. The method of claim 9, wherein the method operation of tracking the identified head of the user during display of the scene includes,
   scanning a portion of each frame in the image data for the identified head.

14. The method of claim 9, wherein the method operation of translating a view-frustum in accordance with the change in location of the head of the user includes,
   shifting the scene defined through the view-frustum while maintaining a lateral orientation of the head to a view port.

15. A system enabling interactive user control for defining a visible volume being displayed, comprising:

a computing device;

a display screen in communication with the computing device, the display screen configured to display image data defined through a view-frustum;

a tracking device in communication with the computing device, the tracking device capable of capturing a location change of a control object, wherein the location change of the control object effects an alignment of the view-frustum in the opposite direction relative to the display screen, wherein the computing device stores a marker-less reference image of the control object for comparison to each successive frame of image data captured through the tracking device and wherein the computing device adjusts a scale of the display image data according to a change in a distance of the control object from the tracking device, wherein the computing device is configured to adjust a view port size associated with the image data so that when the view frustum is adjusted, focus on an object within the view-frustum is maintained.

16. The system of claim 15, wherein the tracking device is a camera.

17. The system of claim 15, wherein the computing device is a video game console.

18. The system of claim 15, wherein the computing device is configured to map coordinates associated with the location change of the control object to a view change associated with a camera position.

19. The system of claim 15, wherein the computing device is configured to maintain a substantially normal gaze direction relative to a plane associated with the display screen for both the view-frustum and a view-frustum associated with the location change of the control object.

20. A method for processing interactive user control for a view of a scene displayed on a virtual window, comprising:

identifying a head of a user that is to interact with the scene;

storing an initial frame of user image data representing the head of the user, said view of the scene comprises a view-frustum initially defined by a gaze projection of a location of the head through outer edges of the virtual window when the location of the head is substantially normal to about a center point of the virtual window;

tracking the identified head of the user during display of the scene, the tracking enabling detection of a change in location of the head of the user, the tracking including;

laterally adjusting the view-frustum in a direction opposite to the change in location of the head of the user, the lateral adjusting of the view-frustum being in response to tracking a move in the location of the head away from normal relative to the center point of the virtual window, the laterally adjusted view-frustum defined by an updated gaze projection of the changed position of the head through the outer edges of the virtual window;

adjusting a scale of the scene according to a change in a distance of the head of the user from a capture device, the capture device having depth capturing capability; and wherein the location of the head being away from normal relative to the center point of the virtual window changes an angle of the gaze projection, the change in angle of the gaze projection effects a change in viewing angle of the scene provided by a video clip.

21. The method of claim 20, wherein the change in viewing angle of the scene is a result of the detected movement of the head of the user to enable the interaction with the scene.

22. A method for processing interactive user control for a view of a scene displayed on a virtual window, comprising:

identifying a head of a user that is to interact with the scene;

storing an initial frame of user image data representing the head of the user, said view of the scene comprises a view-frustum initially defined by a gaze projection of a virtual viewpoint through outer edges of the virtual window when a location of the head is substantially normal to about a center point of the virtual window;

tracking the identified head of the user during display of the scene, the tracking enabling detection of a change in location of the head of the user, the tracking including, laterally adjusting the virtual viewpoint in a same direction as a move in the location of the head away from normal relative to the center point of the virtual window, so as to laterally adjust the view-frustum in a direction opposite to the lateral adjustment of the virtual viewpoint, the laterally adjusted view-frustum defined by an updated gaze projection of the laterally adjusted virtual viewpoint through the outer edges of the virtual window;

adjusting a scale of the scene according to a change in a distance of the head of the user from a capture device.

* * * * *